United States Patent
El Euch et al.

(10) Patent No.: US 12,493,808 B2
(45) Date of Patent: Dec. 9, 2025

(54) REAL-TIME QUANTUM RANDOM ACCESS MEMORY

(71) Applicant: Abu Dhabi University, Abu Dhabi (AE)

(72) Inventors: Hichem El Euch, Abu Dhabi (AE); Mohammed Abdellatif Abdelaal Zidan, Assuit (EG); Abdelhaleem Mohamed Ahmed Abdelaty, Bisha (SA); Mahmoud Mohamed Ahmed Abdel-Aty, Giza (EG); Ashraf Khalil, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 484 days.

(21) Appl. No.: 18/072,771

(22) Filed: Dec. 1, 2022

(65) Prior Publication Data

US 2023/0229948 A1    Jul. 20, 2023

Related U.S. Application Data

(63) Continuation-in-part of application No. 17/402,620, filed on Aug. 16, 2021, now Pat. No. 11,651,266, which is a continuation of application No. 17/002,782, filed on Aug. 26, 2020, now Pat. No. 11,093,850.

(51) Int. Cl.
*G06N 10/00* (2022.01)
*G06N 10/20* (2022.01)

(52) U.S. Cl.
CPC ................................. *G06N 10/00* (2019.01)

(58) Field of Classification Search
None
See application file for complete search history.

(56) References Cited

U.S. PATENT DOCUMENTS

2020/0311594 A1* 10/2020 Gidney ............... G06F 7/505
2024/0037433 A1*  2/2024 Li ........................ G06N 10/40

* cited by examiner

*Primary Examiner* — Anh Q Tran (57) ABSTRACT

A quantum circuit that is a quantum random access memory that can write basis states of a weighted superposition in real time into a memory cell or a superposition of memory cells. The quantum circuit is a quantum random access memory that can write a prepared superposition. The quantum circuit is a quantum random access memory that can write classical data.

10 Claims, 8 Drawing Sheets

| Item 802 | Size(number of qubits) 804 | Description 806 |
|---|---|---|
| $\|A>$ | n | Used to address $2^n$ locations in the QRAM |
| $\|D>$ | m (where $n \leq m$, or $m \leq n$) | Used to store the data in the QRAM |
| $\|dq>$ | 1 | Used to mark the designated location(s)/ address(es) |
| $\|sup>$ | 1 | Used as a control qubit to help for storing individual basis states into a superposition in a given location among $2^n$ locations. |
| $\|qy>$ | n+m | Used to carry the designated location/ address and the value which we need to read from/write into QRAM. |
| $\|r>$ | 1 | Used to decide if the running operation is reading operation ($\|r>=\|1>$) or writing operation ($\|r>=\|0>$). |
| $\|c\text{-sup}>$ | 1 | Used to decide if it is needed to write a superposition in real time, write state by state in the superposition, in a specific address then ($\|c\text{-sup}>=\|1>$). OR, if it is needed to write, a previously prepared, superposition as a whole at once in a specific address then ($\|c\text{-sup}>=\|0>$). |
| $\|c\text{-phase}>$ | 1 | Used to decide if it is needed to add a phase for a basis state into a superposition in a given location then $\|c\text{-phase}>=\|1>$. If it does not needed to add a phase for a basis state into a superposition then $\|c\text{-phase}>=\|0>$. |
| $\|BI>$ | 1 | Used when it is needed to write the first basis state in the superposition when it is required to write a superposition in the real time ( a basis state after a basis state). If it is needed to write the first basis state, regardless its value, then $\|BI>=\|1>$ in the superposition. But, if it is needed to write any state other than the first basis state then $\|BI>=\|0>$. |

FIG. 1

| Item | Size (qubits) | Description |
|---|---|---|
| \|A> | n | Used to address $2^n$ locations is the \|D> register |
| \|D> | m, (where n ≤ m, or m ≤ n) | Used to store the data |
| \|dq> | 1 | Used to mark the the designated location/address |
| \|qy> | n+m | Used to carray the designated location/address and the value which we need to read from/write into QRAM. |
| \|r> | 1 | Used to decide if the running operation (\|r>=\|1>) is reading operation or writing operation(\|r>=\|0>). |

| Item | Size(number of qubits) | Description |
|---|---|---|
| $|A\rangle$ | n | Used to address $2^n$ locations in the QRAM |
| $|D\rangle$ | m (where n ≤ m, or m ≤ n) | Used to store the data in the QRAM |
| $|dq\rangle$ | 1 | Used to mark the designated location(s)/ address(es) |
| $|sup\rangle$ | 1 | Used as a control qubit to help for storing individual basis states into a superposition in a given location among $2^n$ locations. |
| $|qy\rangle$ | n+m | Used to carry the designated location/ address and the value which we need to read from/write into QRAM. |
| $|r\rangle$ | 1 | Used to decide if the running operation is reading operation ($|r\rangle = |1\rangle$) or writing operation ($|r\rangle = |0\rangle$). |
| $|c\text{-}sup\rangle$ | 1 | Used to decide if it is needed to write a superposition in real time, write state by state in the superposition, in a specific address then ($|c\text{-}sup\rangle = |1\rangle$ ). OR, if it is needed to write, a previously prepared, superposition as a whole at once in a specific address then ($|c\text{-}sup\rangle = |0\rangle$ ). |
| $|c\text{-}phase\rangle$ | 1 | Used to decide if it is needed to add a phase for a basis state into a superposition in a given location then $|c\text{-}phase\rangle = |1\rangle$ . If it does not needed to add a phase for a basis state into a superposition then $|c\text{-}phase\rangle = |0\rangle$. |
| $|Bl\rangle$ | 1 | Used when it is needed to write the first basis state in the superposition when it is required to write a superposition in the real time ( a basis state after a basis state). If it is needed to write the first basis state, regardless its value, then $|Bl\rangle = |1\rangle$ in the superposition. But, if it is needed to write any state other than the first basis state then $|Bl\rangle = |0\rangle$. |

REAL-TIME QUANTUM RANDOM ACCESS MEMORY

BACKGROUND

Due to the increased demand for quantum computing devices and applications, quantum random access memory (RAM) systems are becoming increasingly important. RAM systems are used for short term memory whereby any storage location in the RAM can be accessed. Various applications of quantum computing include quantum computers, quantum communications, quantum artificial intelligence, quantum teleportation, and other quantum technologies. Currently, there is no effective RAM systems can be used for quantum computers and the mentioned application.

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may provide for a quantum circuit design used within a quantum random access memory ("QRAM") device. In embodiments, the quantum circuit design described herein may use reversible gates and is not restricted to a particular quantum system. In embodiments, universal gates may include CNOT, NOT, C-C-CNOT gates, controlled-controlled-SWAP gates, multi-qubit Toffoli gates, and Hadamard gates. In embodiments, the quantum circuit design is more efficient in transferring information across the quantum circuit design. In embodiments, the quantum circuit design requires only a O(1) call to access a given address/superposition of addresses rather than O(N) calls. Accordingly, in embodiments, the quantum circuit design results in faster calculations due to requiring only a O(1) call. Thus, the systems, devices, and/or methods described herein provide for a quantum circuit design that is faster in reading or writing information has capable of using reversible gates that allows for use of the quantum circuit design in various different quantum systems. Thus, embodiments, the quantum circuit design, described herein, may be used in a quantum RAM system which is faster in reading and writing information with less errors. In embodiments, while the proposed QRAM may be used in a quantum computer; the QRAM can also be used for a classical computer. In embodiments, by using the circuit design in a classical computer, the capacity of RAM can be increased from m GB/TB/ZB to $2^m$ GB/TB/ZB.

Figure 1:
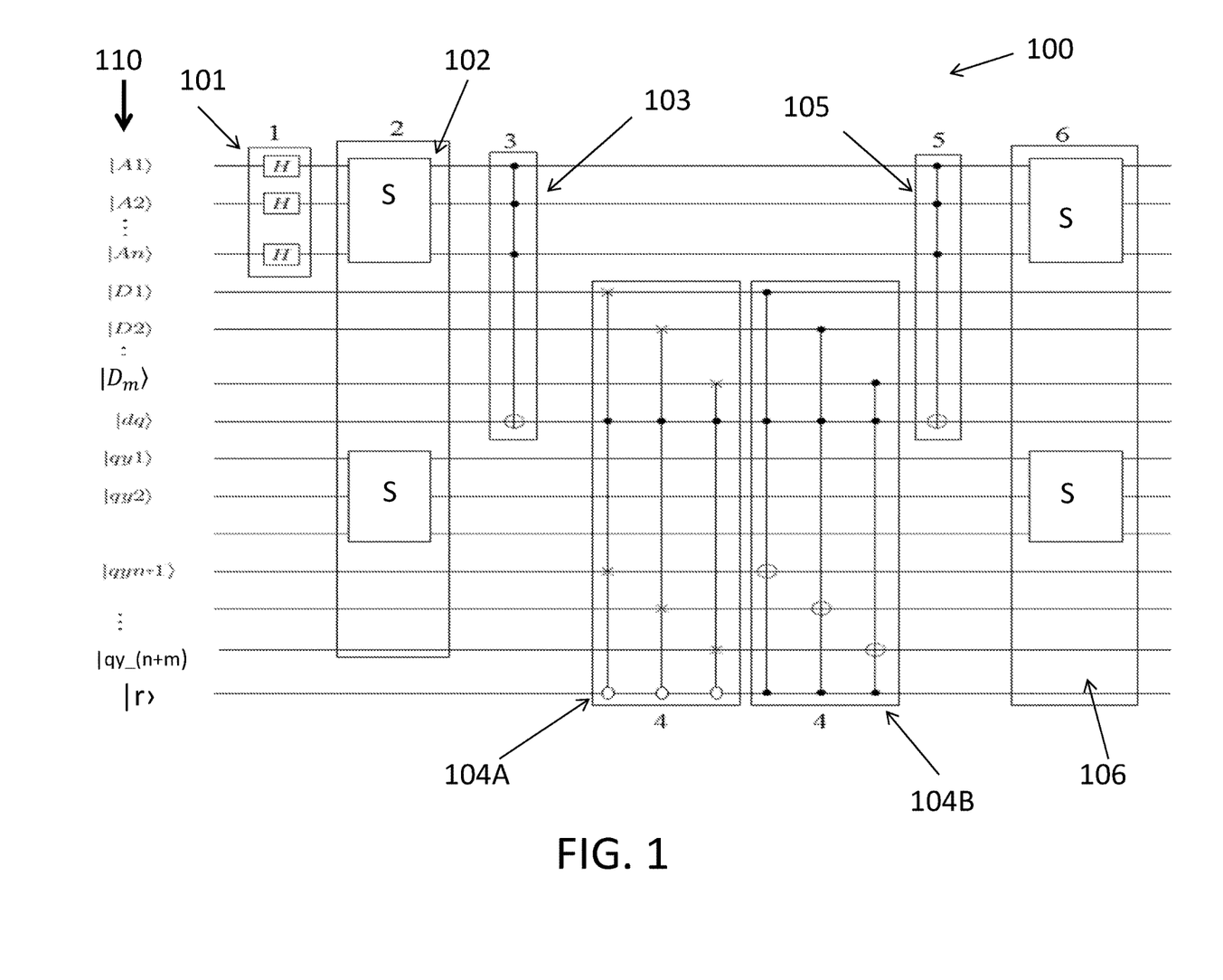
FIG. 1 is an example of the proposed quantum circuit for the proposed QRAM.

FIG. 1 describes an example structure of the proposed QRAM circuit 100. In embodiments, circuit 100 includes n of Hadamard gates 101, S operator 102, n+1-qubit Toffoli gate 103, m of controlled-controlled-SWAP gates 104A, m of 4-qubit Toffoli gates 104B, n+1-qubit Toffoli gate 105, and S operator 106. In embodiments, circuit design 100 may be a main quantum circuit for a proposed QRAM. In embodiments, Hadamard gates 101 may include n (n greater or equal to 1) Hadamard gates which are type of quantum—gate which can act on a single qubit (quantum bit) where for each address qubit in the register |A> there is a Hadamard gate. In embodiments, Hadamard gates 101 may be a one-qubit version of a quantum Fourier transform. In embodiments, S operator 102 and 106 may be a quantum circuit auxiliary operator that is composed of n CNOT gates and n quantum X-gates. In embodiments, S operator 102 and 106 may include a set of n CNOT gates and n quantum-NOT gates. In embodiments, each one of CNOT gates in S operator 102 and 106 may act on two qubits.

Figure 2:
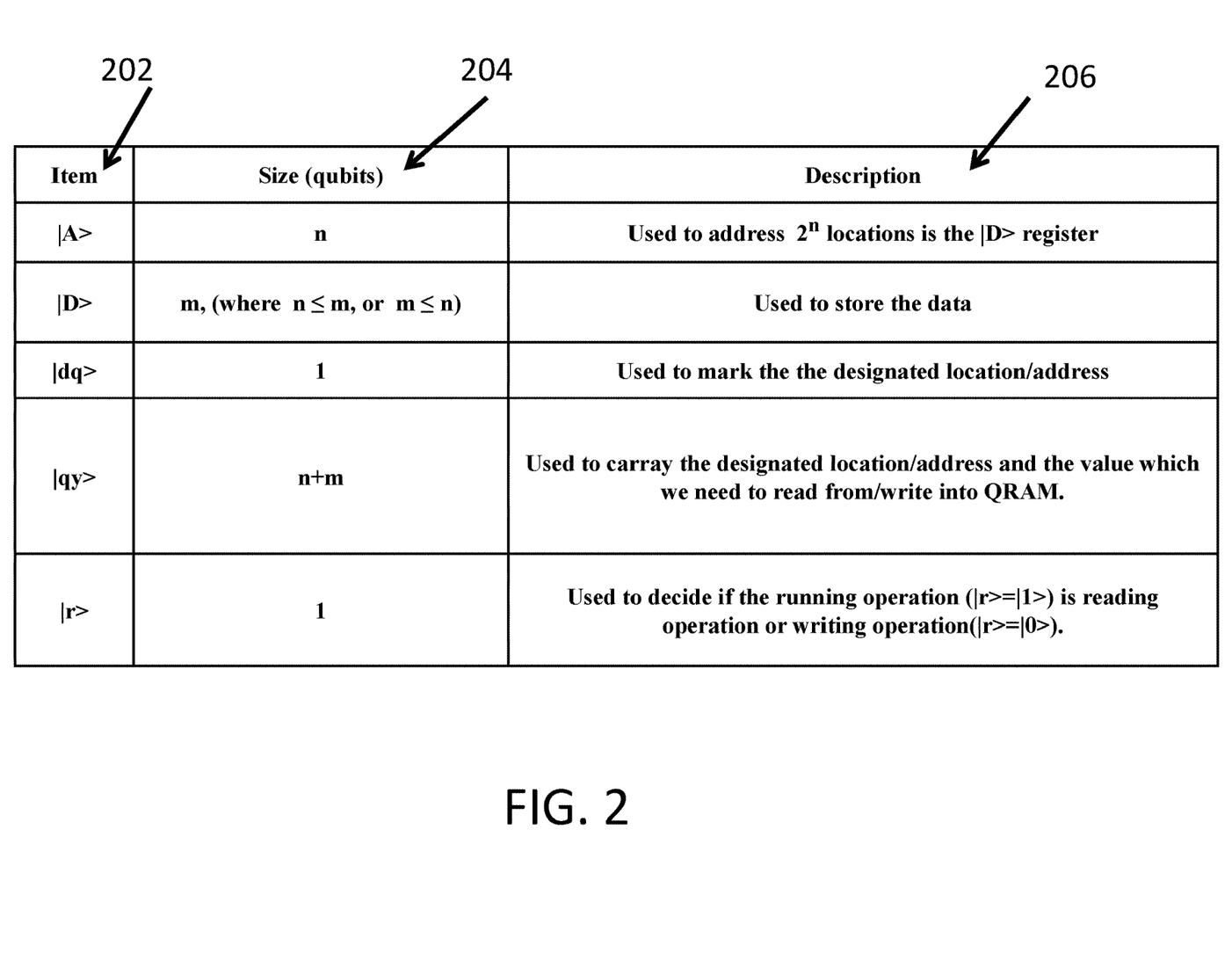
FIG. 2 is a diagram of quantum registers.

In embodiments, n+1-qubit Toffoli gates 103 and 105 are reversible quantum gates. As shown in FIG. 2, gate 104A contains m of controlled-controlled-SWAP gates and gate 104B contains m of 4-qubit Toffoli gates. In embodiments, controlled-controlled-SWAP gates, $C^0$-C-SWAP, perform a controlled-controlled two-qubit SWAP, this gate swaps the state of each qubit in the register |qy>, which has indices n+1, ..., n+m, with the state of the corresponding each qubit in the register |D> in the if the state of the control-qubit |r>=|0> and the state of the control-qubit |dq>=|1>. In embodiments, S operator 106 can be used to undo the effect of S operator 102.

FIG. 2 shows an example information table that describes various features of circuit 100. As shown in FIG. 2, item 202 describes different registers that are shown in column 110 of FIG. 1. In embodiments, Register |A> is an address register which is used to address the locations of register |D>. Thus, register |A> represents the addresses of the locations of the variables in a quantum RAM (QRAM). In embodiments, |A> with the size of "n" qubits and is used to address $2^n$ locations in the |D> register. In embodiments, |D> is with m qubits (where n≤m, or m≥n) and is used to store data. In embodiments, |dq> has only one qubit and is used to mark a designated address/superposition of addresses by entanglement. In embodiments, |dq> may be initialized by state |0>. In embodiments, |qy> may have n+m of qubits and is used to carry the designated address/superposition of addresses and value(s) needed to read from/write into QRAM. In embodiments, the first n qubits of register |qy> are used to carry a given address/superposition of addresses of variable(s) provided by a quantum computer (or quantum circuit/device) while the other m qubits are used to carry the value(s) in the variable(s) to transfer it to a specific address/superposition of addresses in the quantum RAM ("QRAM") or used to read the data from the QRAM. In embodiments, |r> composed by only one qubit and it is used to decide if the running operation (|r>=|1>) is a reading operation being conducted in the QRAM or a writing operation (|r>=|0>) is being conducted in the QRAM (e.g., across circuit design 100).

Figure 3:
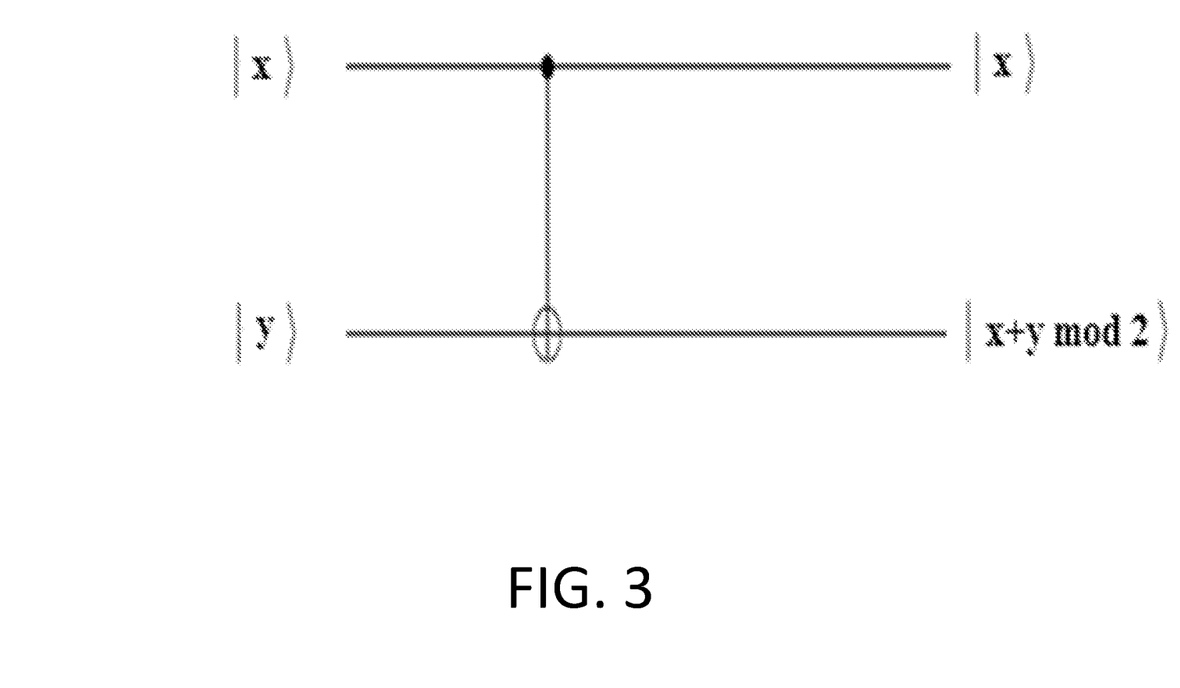
FIG. 3 is a diagram of an example quantum CNOT gate.

FIG. 3 shows an example CNOT gate. In embodiments, |x> qubit is a control qubit and |y> is a target qubit. In embodiments, CNOT gate negates the state of the target qubit if the state of the control qubit is |1>. In embodiments, using the proposed circuit, of the proposed QRAM, 100, an algorithm is applied by Hadamard gates 101, where in each of the Hadamard gates 101 is applied to a single qubit of register |A> to address $2^n$ locations in the QRAM. Next, when an address/superposition of addresses is loaded in the first n-qubit of register |qy>, S operator 102 searches about this address in the QRAM. Thus, circuit 100 uses S gates 102 to find the address/superposition of addresses, among $2^n$ addresses of register |A⟩ which is then assigned by a quantum processor/circuit by first n qubits of the register |qy⟩. In embodiments, S operator 102 is composed by n of C-NOT gates followed by X-gates. For example, S operator 102 is composed of a set of n CNOT gates and n quantum NOT gates (X gates). In embodiments, CNOT gates act as two qubit gates.

Figure 4:
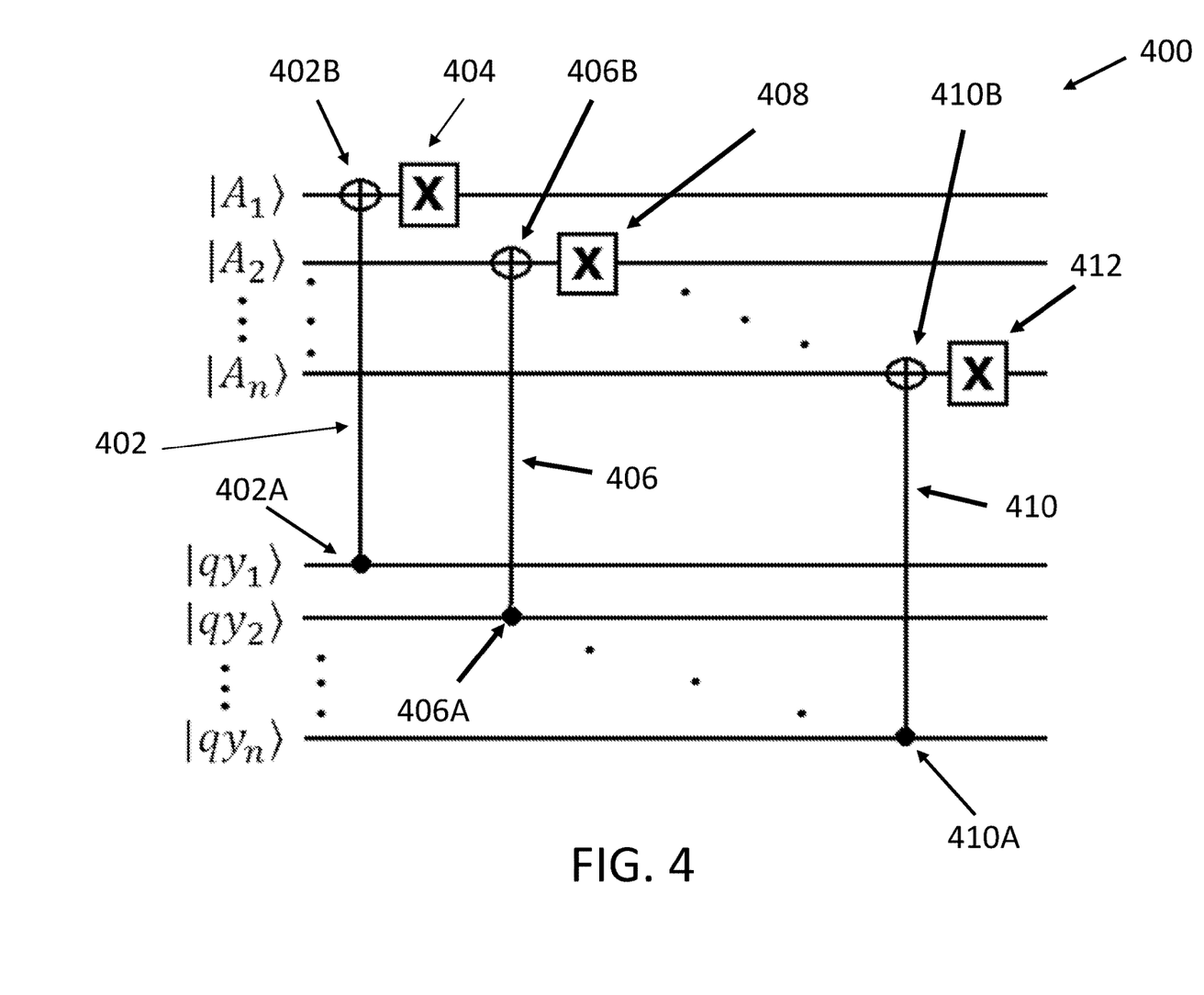
FIG. 4 is a diagram of example elementary gates for S Operator.

An example S operator 400 is shown in FIG. 4. In embodiments, S operator 400 is similar to S operator 102, and/or S operator 106 as described in FIG. 1. In embodiments, FIG. 4 shows the structure of the operator S. In FIG. 4, the S operator is applied on the first n qubits of the register |qy⟩ and the resister |A⟩ as described in FIG. 1. As shown in FIG. 4, operation 402 may show a qubit that negates (402B) if the state of the control qubit (402A) is |1⟩. In embodiments, X-gate 404 negates the states the first qubit of the register |A⟩. Furthermore, as shown in FIG. 4, operation 406 may show a second qubit that negates (406B) if the state of the control qubit (406A) is |1⟩. In embodiments, X-gate 408 then negates the second qubit in the register |A⟩. Furthermore, as shown in FIG. 4, operation 410 may show the $n^{th}$ qubit of the register |A⟩ is negated (410B) if the state of the $n^{th}$ control qubit (410A) in the register |qy⟩ is |1⟩. In embodiments, X-gate 412 then negates the $n^{th}$ qubit and any additional qubits.

After S gates 102, n+1-qubit Toffoli gate 103 is used to mark the address/superposition of addresses which matches the input address/superposition of addresses in register |qy⟩ by entangling |dq⟩ with this address/superposition of addresses to mark this address/superposition of addresses in the superposition. In embodiments, n+1-qubit Toffoli gate 103 is defined as $$T_{A_1A_2\ldots A_nd_q}{}^n = |A_1A_2\ldots A_nd_q, (A_1A_2\ldots A_n+d_q) \mod 2\rangle$$

After n+1-qubit Toffoli gate 103, either m of controlled-controlled-SWAP ($C^0$-C-SWAP), gates 104A or m of 4-qubit Toffoli gates 104B are applied. The algorithm does the reading process from a given address/superposition of addresses provided by the quantum processor/microcontroller/quantum circuit through the first n qubits of register |qy⟩. If the qubit |r⟩ is loaded with state |1⟩ by the quantum processor/microcontroller/quantum circuit then the m of 4-qubit Toffoli gates 104B are running to make a copy of the value(s) of the variable(s) to the last m qubits of register |qy⟩. Meanwhile, the m of controlled-controlled-SWAP, $C^0$-C-SWAP, gates are not working, and the reading process is done. On the other hand, if the quantum processor (e.g., microcontroller, quantum-circuit, etc.) loads the state |0⟩ to the qubit |r⟩, consequently, the m of controlled-controlled-SWAP, $C^0$-C-SWAP, gates 104A are running to write the value(s) stored in the last m qubits of the register |qy⟩ into QRAM address/superposition of addresses specified by the first n qubits. Meanwhile, the m of 4-qubit Toffoli, gates 104B are not working as the writing process is being conducted. After m controlled-controlled-SWAP, $C^0$-C-SWAP, gates 104A and m of 4-qubit Toffoli (shown as gates 104B), n+1-qubit Toffoli gate 105 removes the marking entangled with the qubit |dq⟩ by applying n+1-qubit Toffoli gate 105 to make it disentangled. After n+1-qubit Toffoli gate 105, S operator 106 undoes the effect of S operator 102 by applying S operator 106 once again to make the QRAM ready to next read/write process, where S operator 106 is applied.

In a first non-limiting example, the proposed QRAM, circuit 100 may be used to write a value [101] in a location/address |001⟩ and then reads the value from this location/address. In this non-limiting example, address initialization is conducted by applying three Hadamard gates to three qubits of register |A⟩ to create a complete superposition of states of the address register |A⟩ to address $2^3=8$ locations described by register |D⟩, in the QRAM (e.g., circuit 100). This is also shown by:

$$|\psi_0\rangle = H^{\otimes 3}|A\rangle \otimes I^{\otimes n}|D\rangle \otimes I|dq\rangle \otimes I^{\otimes 2n}|qy\rangle \otimes I|r\rangle$$

$$|\psi_0\rangle = H^{\otimes 3}|000\rangle \otimes I^{\otimes n}|000\rangle \otimes I|0\rangle \otimes I^{\otimes 2n}|000000\rangle \otimes I|0\rangle =$$

$$\frac{1}{\sqrt{8}}(|000, 000, 0, 000\,000, 0\rangle + |001, 000, 0, 000\,000, 0\rangle +$$

$$|010, 000, 0, 000\,000, 0\rangle + |011, 000, 0, 000\,000, 0\rangle + |100,$$

$$000, 0, 000\,000, 0\rangle + |101, 000, 0, 000\,000, 0\rangle + |110,$$

$$000, 0, 000\,000, 0\rangle + |111, 000, 0, 000\,000, 0\rangle).$$

In this first non-limiting example, once the address initialization is conducted, QRAM (e.g., circuit 100) can conduct a writing operation. In this non-limiting example, the value |101⟩ is to be stored in location/address |001⟩. Thus, the first three qubits of register |qy⟩ are loaded with the target location in the QRAM (e.g., circuit 100) while loading the last three qubits with the value needed to store.

Thus, the state of the register |qy⟩ is |qy⟩=|001, 101⟩ and set the control qubit |r⟩ to state |0⟩ for the QRAM to perform writing operations. In this first non-limiting example, an S operator (e.g., S operator 102) is applied between the first three qubits of register |qy⟩ and register |A⟩ to search for the designated location/address. Thus, the S operation transfers the designated location/address to state |111⟩ as follows:

$$|\psi_0\rangle = \frac{1}{\sqrt{8}}(|000, 000, 0, 001\,101, 0\rangle + |001, 000, 0, 001\,101, 0\rangle + |010,$$

$$000, 0, 001\,101, 0\rangle + |011, 000, 0, 001\,101, 0\rangle + |100,$$

$$000, 0, 001\,101, 0\rangle + |101, 000, 0, 001\,101, 0\rangle + |110,$$

$$000, 0, 001\,101, 0\rangle + |111, 000, 0, 001\,101, 0\rangle).$$

$$|\psi_0\rangle = \frac{1}{\sqrt{8}}(|110, 000, 0, 001\,101, 0\rangle + |111, 000, 0, 001\,101, 0\rangle + |100,$$

$$000, 0, 001\,101, 0\rangle + |101, 000, 0, 001\,101, 0\rangle + |010,$$

$$000, 0, 001\,101, 0\rangle + |011, 000, 0, 001\,101, 0\rangle + |000,$$

$$000, 0, 001\,101, 0\rangle + |001, 000, 0, 001\,101, 0\rangle).$$

In this first non-limiting example, $T_{A_1A_2A_nd_q}{}^3$ gate is applied (e.g., 4-qubit Toffoli gate 103) and negates the state of the qubit |dq⟩ only if the state of the address register |A⟩ is in the state |A⟩=|111⟩ as follows:

$$|\psi_2\rangle = \frac{1}{\sqrt{8}}(|110, 000, 0, 001\,101, 0\rangle + |111, 000, 1, 001\,101, 0\rangle + |100,$$

$$000, 0, 001, 101, 0\rangle + |101, 000, 0, 001\,101, 0\rangle + |010,$$

$$000, 0, 001\,101, 0\rangle + |011, 000, 0, 001\,101, 0\rangle + |000,$$

$$000, 0, 001\,101, 0\rangle + |001, 000, 0, 001\,101, 0\rangle).$$

In this first non-limiting example, gate will not be applied (e.g., gate 104B) because the state of the qubit |r⟩ is |0⟩. However, the gate $C^0$-C-SWAP$_{rdqqy_{n+i}D_i}$(i=1, 2, 3) (e.g. gate 104A) will apply as it is controlled by state |r⟩=|0⟩. Thus, the writing operation is executed since the controlled-controlled-SWAP gate is applied to write the value stored in the last m qubits of the register |qy⟩ into a QRAM location specified by the first n qubits. Thus:

$$|\psi_3\rangle = \frac{1}{\sqrt{8}}(|110, 000, 0, 001\ 101, 0\rangle + |111, 101, 1, 001\ 000, 0\rangle + |100,$$

$$000, 0, 001, 101, 0\rangle + |101, 000, 0, 001\ 101, 0\rangle + |010,$$

$$000, 0, 001\ 101, 0\rangle + |011, 000, 0, 001\ 101, 0\rangle + |000,$$

$$000, 0, 001\ 101, 0\rangle + |001, 000, 0, 001\ 101, 0\rangle).$$

In this first non-limiting example, QRAM (e.g., circuit 100) may undo the effect of a previous gate (e.g., gate 104A) after the writing process is done by applying $T_{A_1A_2A_3d_q}^3$ (e.g., 4-qubit Toffoli gate 105) gate as follows:

$$|\psi_3\rangle = \frac{1}{\sqrt{8}}(|110, 000, 0, 001\ 101, 0\rangle + |111, 101, 0, 001\ 000, 0\rangle + |100,$$

$$000, 0, 001, 101, 0\rangle + |101, 000, 0, 001\ 101, 0\rangle + |010,$$

$$000, 0, 001\ 101, 0\rangle + |011, 000, 0, 001\ 101, 0\rangle + |000,$$

$$000, 0, 001\ 101, 0\rangle + |001, 000, 0, 001\ 101, 0\rangle).$$

In this first non-limiting example, the circuit undoes the effect of S operator 102 after the writing process is done by applying the S operator again (e.g., S operator 106). Thus:

$$|\psi_5\rangle = \sqrt{8}(|000, 000, 0, 001\ 101, 0\rangle + |001, 101, 0, 001\ 000, 0\rangle +$$

$$|010, 000, 0, 001\ 101, 0\rangle + |011, 000, 0, 001\ 101, 0\rangle +$$

$$|100, 000, 0, 001\ 101, 0\rangle + |101, 000, 0, 001\ 101, 0\rangle +$$

$$|110, 000, 0, 001\ 101, 0\rangle + |111, 000, 0, 001\ 101, 0\rangle).$$

In this first non-limiting example, the probability of the state |001, 101⟩ of the registers |A, D⟩ is ⅛ which means that the writing process is performed successfully.

Thus, in this first non-limiting example, the value |101⟩ is stored in the location |001⟩.

In a second non-limiting example, once address initialization is conducted (similar to that described in the first non-limiting example), a value |101⟩ is read from location/address |001⟩. In this second non-limiting example, the first n qubits of register |qy⟩ are loaded with the target location in the QRAM (e.g., circuit 100). Thus, the state of the register qubit |r⟩ to state |1⟩ to perform a reading operation. Thus, the state of the QRAM is:

$$|\psi_0\rangle = \frac{1}{\sqrt{8}}(|000, 000, 0, 001\ 000, 1\rangle + |001, 101, 0, 001\ 000, 1\rangle +$$

$$|010, 000, 0, 001\ 000, 1\rangle + |011, 000, 0, 001\ 000, 1\rangle +$$

$$|100, 000, 0, 001\ 000, 1\rangle + |101, 000, 0, 001\ 000, 1\rangle +$$

$$|110, 000, 0, 001\ 000, 1\rangle + |111, 000, 0, 001\ 000, 1\rangle).$$

In this second non-limiting example, an S operator (e.g., S operator 102) is applied between the first three qubits of register |qy⟩ and register |A⟩ to search for a designated location/address. Thus, the S operator transfer the designated location/address to state |111⟩ as follows:

$$|\psi_1\rangle = \frac{1}{\sqrt{8}}(|110, 000, 0, 001\ 000, 1\rangle + |111, 101, 0, 001\ 000, 1\rangle +$$

$$|100, 000, 0, 001\ 000, 1\rangle + |101, 000, 0, 001\ 000, 1\rangle +$$

$$|010, 000, 0, 001\ 000, 1\rangle + |011, 000, 0, 001\ 000, 1\rangle +$$

$$|000, 000, 0, 001\ 000, 1\rangle + |001, 000, 0, 001\ 000, 1\rangle).$$

In this second non-limiting example, another gate (e.g., gate 104B) is applied. Thus, this particular gate negates the state of the qubit |dq⟩ only if the state of the address registers |A⟩ is in the state |A⟩=|111⟩ as follows:

$$|\psi_1\rangle = \frac{1}{\sqrt{8}}(|110, 000, 0, 001\ 000, 1\rangle + |111, 101, 1, 001\ 000, 1\rangle +$$

$$|100, 000, 0, 001\ 000, 1\rangle + |101, 000, 0, 001\ 000, 1\rangle +$$

$$|010, 000, 0, 001\ 000, 1\rangle + |011, 000, 0, 001\ 000, 1\rangle +$$

$$|000, 000, 0, 001\ 000, 1\rangle + |001, 000, 0, 001\ 000, 1\rangle).$$

In this second non-limiting example, gates $C^0$-C-SWAP$_{rdqqy_{n+i}D_i}$(i=1, 2, 3) (e.g., gate 104A) does not work because the state of qubit |r⟩ is |1⟩.

Meanwhile, the gates $T_{rdqqy_{n+i}D_i}^3$ (C-C-CNOT gate) work because they are controlled by state |r⟩ is |1⟩. Thus, the reading operation occurs as follows:

$$|\psi_2\rangle = \frac{1}{\sqrt{8}}(|110, 000, 0, 001\ 000, 1\rangle + |111, 101, 1, 001\ 101, 1\rangle +$$

$$|100, 000, 0, 001\ 000, 1\rangle + |101, 000, 0, 001\ 000, 1\rangle +$$

$$|010, 000, 0, 001\ 000, 1\rangle + |011, 000, 0, 001\ 000, 1\rangle +$$

$$|000, 000, 0, 001\ 000, 1\rangle + |001, 000, 0, 001\ 000, 1\rangle).$$

In this second non-limiting example, the QRAM undoes the effect of step 3 after the reading process is completed by applying the $T_{A_1A_2A_3d_q}^3$ (e.g., 4-qubit Toffoli, gate 105) as follows:

$$|\psi_3\rangle = \frac{1}{\sqrt{8}}(|110, 000, 0, 001\ 000, 1\rangle + |111, 101, 0, 001\ 101, 0\rangle +$$

$$|100, 000, 0, 001\ 000, 1\rangle + |101, 000, 0, 001\ 000, 1\rangle +$$

$$|100, 000, 0, 001\ 000, 1\rangle + |101, 000, 0, 001\ 000, 1\rangle +$$

$$|110, 000, 0, 001\ 000, 1\rangle + |111, 000, 0, 001\ 000, 1\rangle).$$

In this second non-limiting example, the circuit undoes the effect of S gate 102 after the writing process is done by applying the S operator again (e.g., S operator 106). Thus:

$$|\psi_4\rangle = \frac{1}{\sqrt{8}}(|000, 000, 0, 001\ 000, 1\rangle + |001, 101, 0, 001\ 101, 1\rangle +$$

$|010,000,0,001\,000,1\rangle+|011,000,0,001\,000,1\rangle+$ $|100,000,0,001\,000,1\rangle+|101,000,0,001\,000,1\rangle+$ $|110,000,0,001\,000,1\rangle+|111,000,0,001\,000,1\rangle).$ In embodiments, in this second non-limiting example, the probability of the state |001, 101> of the registers |qy> is ⅛ which means that the reading process is performed successfully.

In embodiments, the first non-limiting example and the second non-limiting example shows how a proposed QRAM writes the value |101> in the location/address |001>, then how it reads this value from this location/address.

Figure 5:
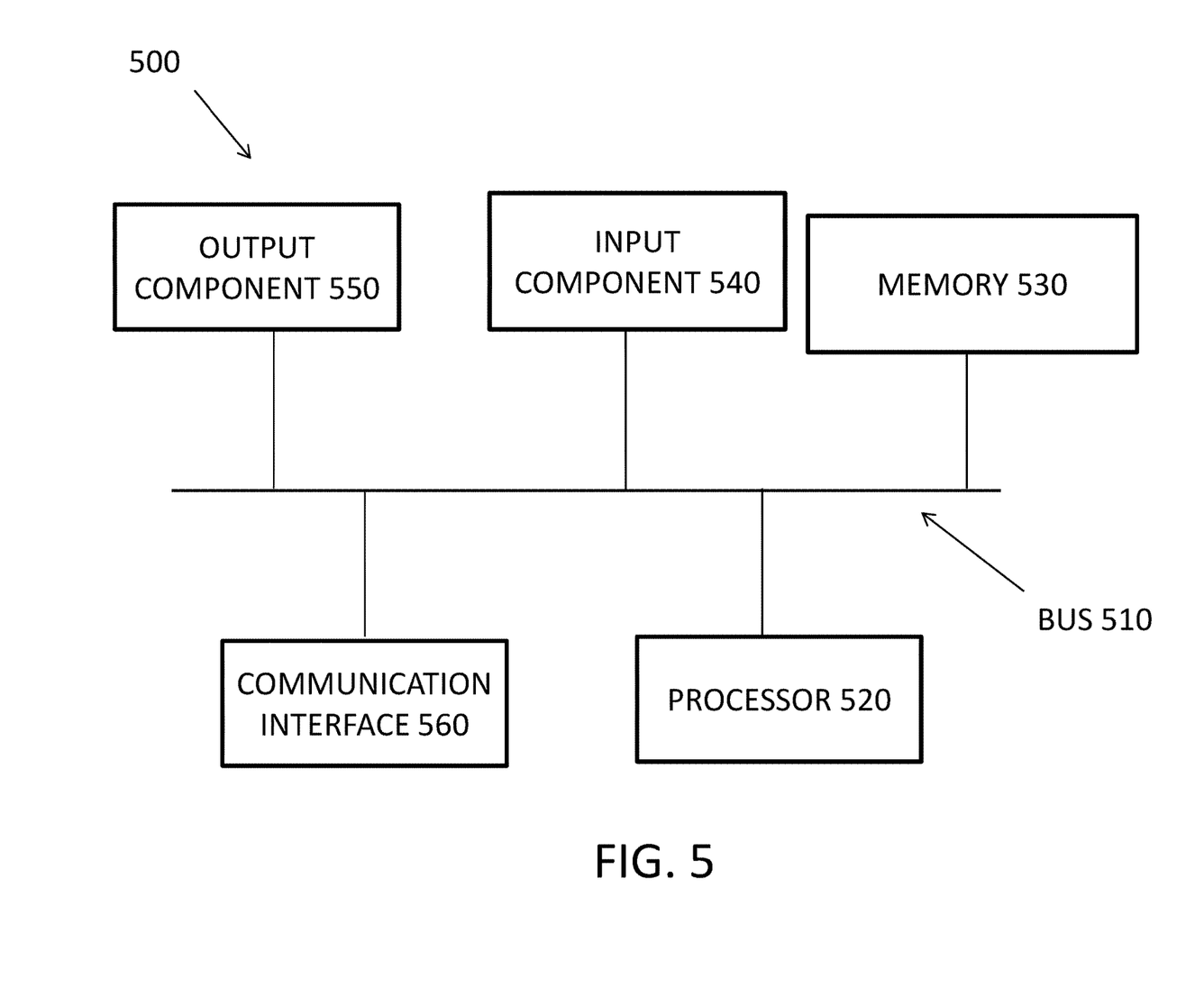
FIG. 5 is a diagram of an example device.

FIG. 5 is a diagram of example components of a device 500. Device 500 may correspond to a computing device, such as devices that may use circuit 100 (the proposed QRAM). As shown in FIG. 5, device 500 may include a quantum bus 510, a processor 520, a memory (QRAM) 530, quantum input component 540, quantum output component 550, and a communications interface 560. In other implementations, device 500 may contain fewer components, additional components, different components, or differently arranged components than depicted in FIG. 5. Additionally, or alternatively, one or more components of device 500 may perform one or more tasks described as being performed by one or more other components of device 500.

Bus 510 may include a path that permits communications among the components of device 500. Processor 520 may include one or more processors, microprocessors, and/or processing logic (e.g., a field programmable gate array (FPGA), quantum teleportation devices, quantum communication devices, quantum computing circuits, quantum encryption applications and/or an application specific integrated circuit (ASIC)) that interprets and executes instructions. Memory 530 may include the proposed QRAM circuit for use by processor 520. Input component 540 may include a mechanism that permits a user to convert classical information to quantum input information to device 500, such as a quantum circuit, a quantum-based application, a keyboard, a keypad, a button, a switch, voice command, etc. Output component 550 may include a mechanism that outputs information and transforms quantum information to classical information to be provided to the user, such as a display, a speaker, one or more light emitting diodes (LEDs), etc.

Communications interface 560 may include any transceiver-like mechanism that enables device 500 to communicate with other devices and/or systems. For example, communications interface 560 may include an Ethernet interface, an optical interface, a coaxial interface, a wireless interface, or the like and quantum-to-classical and vice versa unit.

In another implementation, communications interface 560 may include, for example, a transmitter that may convert baseband signals from processor 520 to radio frequency (RF) signals and/or a receiver that may convert RF signals to baseband signals. Alternatively, communications interface 560 may include a transceiver to perform functions of both a transmitter and a receiver of wireless communications (e.g., radio frequency, infrared, visual optics, quantum wireless, quantum channels, quantum fiber optics, quantum teleportation, quantum communication devices/networks, quantum encryption devices, etc.), wired communications (e.g., conductive wire, twisted pair cable, coaxial cable, transmission line, fiber optic cable, waveguide, single-photon channels, multi-photon channels, etc.), or a combination of wireless and wired communications.

Communications interface 560 may connect to an antenna assembly (not shown in FIG. 5) for transmission and/or reception of the RF signals, and/or quantum channels. The antenna assembly may include one or more antennas to transmit, quantum channels and/or receive RF signals over the air. The antenna assembly may, for example, receive RF signals and/or quantum information from communications interface 560 and transmit the RF signals over the air, and receive RF signals over the air and provide the RF signals to communications interface 560. In one implementation, for example, communications interface 560 may communicate with a network (e.g., a wireless network, quantum network, quantum channel, wired network, Internet, quantum internet, etc.). In embodiments, an antenna may be implemented by quantum teleportation protocols, quantum communication protocols and/or quantum encryption protocols.

As will be described in detail below, device 500 may perform certain operations. Device 500 may perform these operations in response to processor 520 executing software instructions (e.g., computer program(s), quantum computing circuit, quantum teleportation, etc.) contained in a computer-readable medium/quantum-based computing, such as memory 530, a secondary storage device (e.g., hard disk, CD-ROM, etc.), or other forms of RAM or ROM. In embodiments, a part of memory 530 may include circuit 100 as described in FIG. 1. A computer-readable medium may be defined as a non-transitory memory device. A memory device may include space within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

Figure 6:
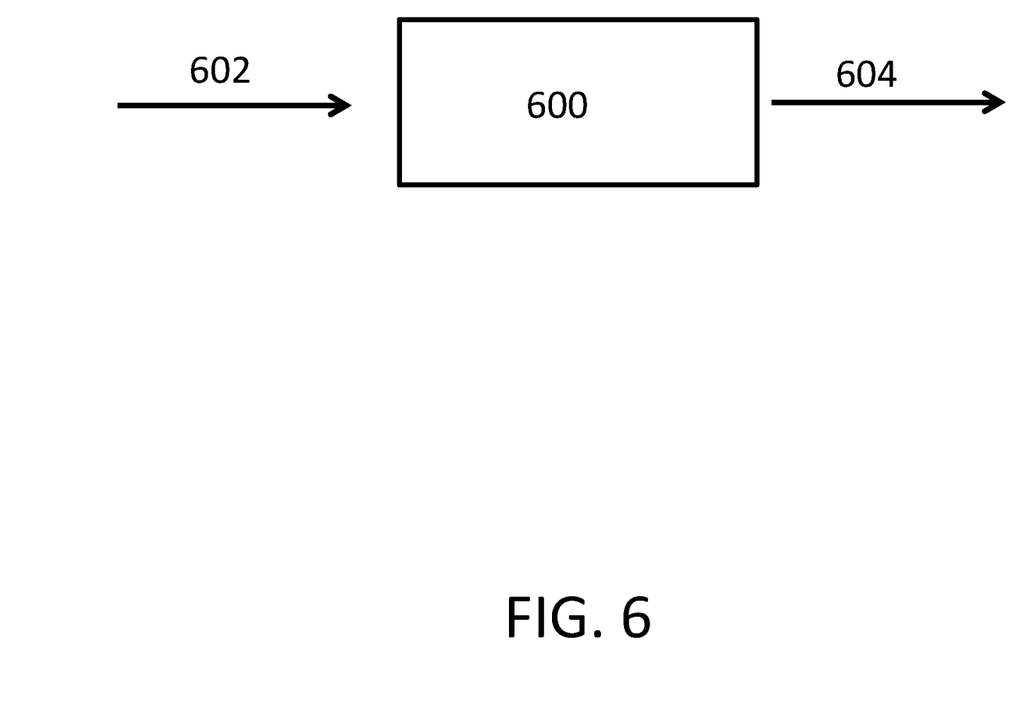
FIG. 6 is a diagram of an example process.

FIG. 6 is an example diagram. FIG. 6 describes device 600, input 602, and output 604. In embodiments, device 600 may a computing device with features/structures similar to that described in FIG. 6. In embodiments, device 600 may be a computing device that is part of a laptop, desktop, tablet, smartphone, quantum computer, quantum computing device, quantum communication device, quantum teleportation device, quantum encryption device, quantum internet device, and/or any other device. In embodiments, device 600 may include a QRAM (e.g., circuit 100) similar to that described the above figures.

In embodiments, device 600 may receive communication 602, analyze communication 602, and generate output 604. In embodiments, based on the QRAM in device 600, output 604 which gives a writing fidelity of 99.9971% and a reading fidelity of 99.983% which mean that the QRAM may have a 99.980% accuracy in the information in output 604.

Figure 7:
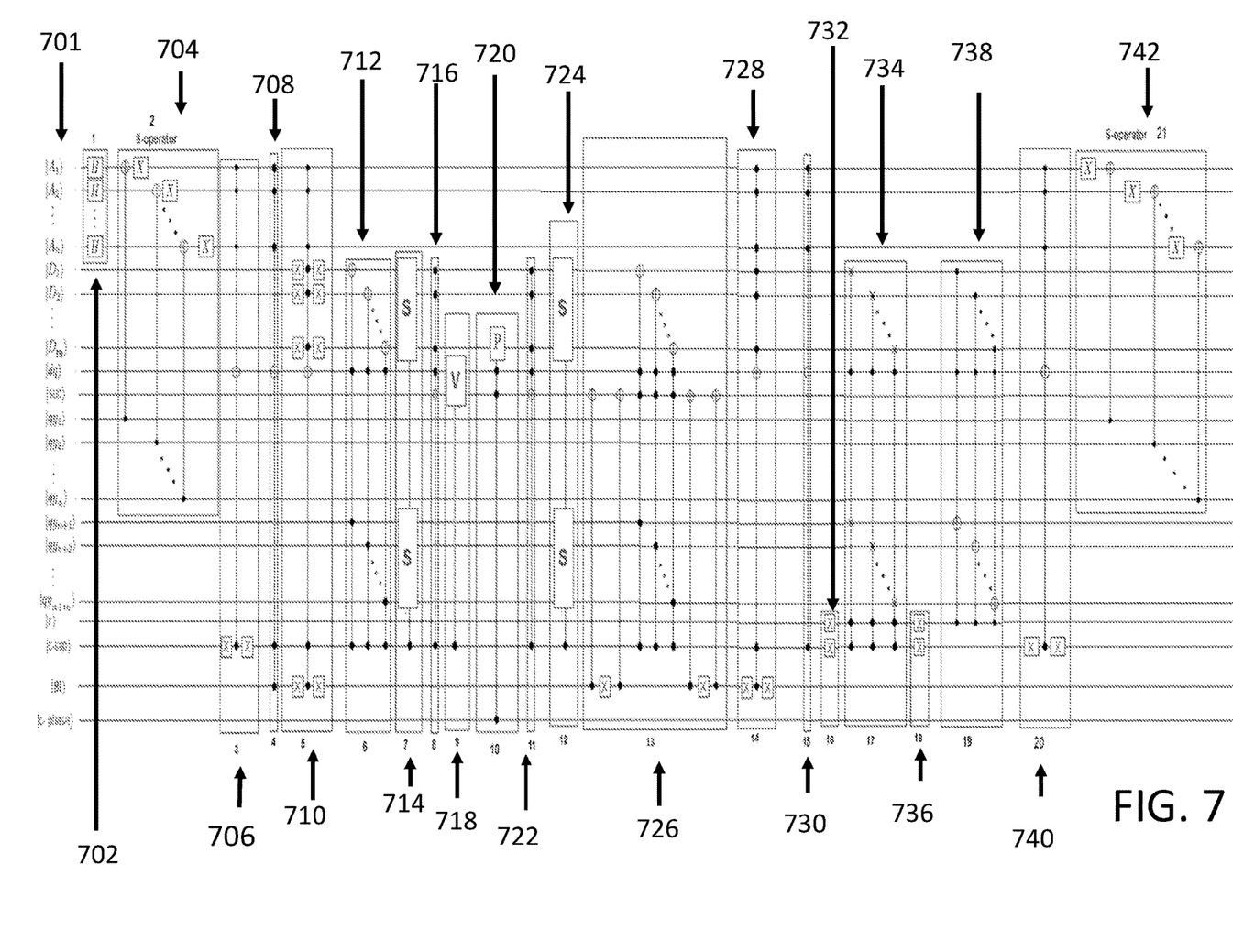
FIG. 7 is an example of another proposed quantum circuit.

FIG. 7 is an example circuit 700 that can conduct example writing and reading operations as a generalized form. In embodiments, example circuit 700 is a QRAM circuit that can write a superposition consists from a set of states such that each a basis state is provided to the QRAM in the real time into a memory cell as well as writing a prepared superposition and/or classical data. In embodiments, example circuit 700 may perform the reading operation from memory cells from a single address or a set of addresses in a superposition.

As shown in FIG. 7, the example circuit 700 (e.g., a QRAM circuit) shows a register $|A\rangle$ which represents an address register which can be used to address the locations of register $|D\rangle$. Accordingly, register $|D\rangle$ may represent locations of particular variables in a QRAM. In embodiments, the size of register $|A\rangle$ may be n qubits to address $2^n$ locations in a QRAM. Thus, the size of $|D\rangle$ is m qubits which is used to represent $2^n$ locations in the QRAM such that each location stores a single state of m qubits or a superposition of $2^m$ states. Additionally, an extra qubit $|dq\rangle$ may be initialized by the state $|0\rangle$. Furthermore, $|qy\rangle$ may be a register of size n+m qubits which may link between a quantum processor (e.g., microcontroller) and a QRAM. In embodiments, the initial state for every qubit in FIG. 7 is $|0\rangle$ in the initialization step.

In embodiments, the first n qubits of register $|qy\rangle$ may be used to carry an address or a superposition of addresses of variable(s) locations provided by a quantum computer, quantum circuit or a quantum microcontroller while other m qubits are used to carry the value of the variables to write it to a specific location in a quantum RAM or used to read the data from a QRAM. In embodiments, an extra qubit $|r\rangle$ is used to distinguish between the reading and writing processes. In embodiments, if $|r\rangle$ is set to $|0\rangle$, then the writing process into a QRAM is conducted. However, in embodiments, if In is set to $|1\rangle$, then a reading process from the QRAM is conducted. The four qubits: $|sup\rangle = |0\rangle$, $|c-sup\rangle = |1\rangle$, $|BI\rangle$, and $|c-phase\rangle = |1\rangle$, are used when it is required to store a superposition of states in the following form $$|d^k\rangle = \alpha_i \sum_i e^{i\theta_i}|i\rangle.$$

Such that it is required to write each basis state individually and sequentially in this superposition in some address label $|a^j\rangle$. At the end, this address location $|a^j\rangle$. will be contain a superposition in the following form:

$$|a^j d^k\rangle = |a^j\rangle . \alpha_i \sum_i e^{i\theta_i}|i\rangle.$$

If it is required that some basis state $|i\rangle$ has no phase, then state of the $|c\text{-phase}\rangle$ is $|0\rangle$. But on the other hand, if it is required to write a previously prepared an unknown superposition/or a classical data in a given address label $|a^j\rangle$, then the state of the qubits is: $|r\rangle = |0\rangle$, $|sup\rangle = |0\rangle$, $|c\text{-sup}\rangle = |0\rangle$, and $|c\text{-phase}\rangle = |0\rangle$ In embodiments, the two qubits $|c-sup\rangle = |1\rangle$, and $|c-phase\rangle = |1\rangle$ are used whenever an individual basis state $|i\rangle$, of Eq. (1), is needed to be stored in a particular location $|d^k\rangle$ that has an address label $|a^j\rangle$ with a probability amplitude and a phase in the form $\alpha_i e^{-i\theta}$ at a time t such that after finishing an operation, this particular address location will contain a superposition as following:

$$|a^j d^k\rangle = |a^j\rangle . \beta_i \sum_i e^{i\theta_i}|i\rangle. \quad (1)$$

where $\Sigma_i |\beta_i e^{i\theta}|^2 = 1$ such that $$\beta_i = \sqrt{\frac{\alpha_i}{M}},$$

and M is a predefined given number. If it is required that a basis state $|i\rangle$ should be stored with no phase then the state of the qubit $|c\text{-phase}\rangle$ is $|0\rangle$ in this step. If it is required to write the first basis state in the superposition then $|BI\rangle = |1\rangle$, when writing other basis states in the same superposition then $|BI\rangle = |0\rangle$.

In embodiments, at a first step (702), n of Hadamard gates are applied such that with each of them is applied to a single qubit of register $|A\rangle$ to address $2^n$ locations in the QRAM.

In embodiments, at a second step (704), when an address or a superposition of addresses is loaded in the first n qubits of register $|qy\rangle$, the S-operator is applied between the first n qubits of the register $|qy\rangle$ and the register $|A\rangle$ to search about this address in QRAM (the register $|A\rangle$). Thus, the proposed QRAM uses the S-operator to find a given address or a superposition of addresses, among $2^n$ addresses of register $|A\rangle$, which assigned by a quantum processor, microcontroller, and/or another quantum circuit by first n qubits of the register $|qy\rangle$. The S-operator is composed from n of C-NOT gates and n of the quantum X-gates (quantum NOT gates). Thus, the CNOT gate is applied between the qubit $|qy\_(i)\rangle$ as the control qubit and the qubit $|A\_(i)\rangle$ as the target qubit, where i=1, 2, . . . , n. Accordingly, the quantum X-gate is applied on the qubit $|A\_(i)\rangle$. Accordingly, the second step transforms the states (addresses) of the register $|A\rangle$, that match the input address/superposition of addresses of the first n qubits of the register $|qy\rangle$, into the state $|1\rangle^{\otimes n}$.

In embodiments, at the third step (706), three gates are applied. First, the X gate is applied on the qubit $|c\text{-sup}\rangle$. Second, the gate $T_{A_1 A_2 \ldots A_n C\text{-}SUP} d_q^{n+1}$ that is controlled by n+1 qubits which are $|c\text{-sup}\rangle$ and n qubits of the register $|A\rangle$. This gate flips the state of the qubit $|dq\rangle$ only if the state of the qubit $|c\text{-sup}\rangle = |0\rangle$ and the state of the register $|A\rangle = |111 \ldots 1\rangle$. Third, the X gate then is applied on the qubit $|c\text{-sup}\rangle$. These three gates are used in this step to mark the address(es) which match the input address/superposition of addresses in the first n qubits of the register $|qy\rangle$ when the state of the qubit $|c\text{-sup}\rangle = |0\rangle$ by entangling the qubit $|dq\rangle$ with the address register $|A\rangle$. This step marks the address or addresses that are used for reading operation or ordinary writing operation for writing an unknown superposition prepared previously and it is fed compactly via the last m qubits of the register $|qy\rangle$.

In embodiments, at a fourth step (708), the n+3-qubit Toffoli gate $T_{c\text{-}supBIA_1 A_2 \ldots A_n d_q}^{n+2}$ is applied. In embodiments, this 3-qubit Toffoli gate has n+2 control qubits which are the n qubits of the register $|A\rangle$, the qubit $|c\text{-sup}\rangle$, and the qubit $|BI\rangle$. The target qubit of this 3-qubit Toffoli gate is $|dq\rangle$. In embodiments, the fourth step marks by entanglement the qubit $|dq\rangle$ with the state in the register $|A\rangle$ that has address defined by the qubits $|qy\_1\rangle$, $|qy\_2\rangle$, . . . , $|qy\_n\rangle$ only if the it is needed to write the first basis state in the superposition. In embodiments, the fourth step marks the address or a superposition of addresses that will be used for writing the first basis state in a superposition of states in a form $|d^k\rangle = \alpha_i \Sigma_i e^{-i\theta_i}|i\rangle$, such that it is required to store each state individually and sequentially (may be in the real-time) in this superposition in a particular address/addresses label(s). In embodiments, the writing operation of basis states of a given superposition, individually a basis state by a basis, in real time in address or a superposition of addresses is accomplished by executing the steps three to fifteen.

In embodiments, at a fifth step (710), m+1 of quantum negation gates, X, are applied on the qubits |D_1>, |D_2>, . . . , |D_m>, and the qubit |BI>. Then a Toffoli gate that is applied on n+m+2 control qubits and a target qubit. The control qubits are n qubits of register |A>, m qubits of register |D>, the qubit |c-sup>, and the qubit |BI>, while the target qubit is |dq>. This step is used to mark the data storage space in the desired address(es) to write a basis state which is not the first basis state in the superposition.

In embodiments, at a sixth step (712), the input value in the qubits |qy_(n+1)>, |qy_(n+2)>, . . . , |qy_(n+m)> are written at the location data register |D_1>, |D_2>, . . . , |D_m>. In embodiments, the writing at the location data register is done by applying m of $T_{c\text{-}sup\ dq\ qy_{n+h}Dh}^3$, which is a gate that has three control qubits namely: |c-sup>, |dq>, the qubit |qy_(n+h)> where the target qubit is |D_h> such that h=1, 2, . . . , m.

In embodiments, at a seventh step (714), the controlled-S operator is applied between the qubits of |qy_(n+1)>, |qy_(n+2)>, . . . , |qy_(n+m)> and the qubits |D_1>, |D_2>, . . . , |D_m>, respectively, where the S-operator is controlled by the qubit |c-sup> in this step. In embodiments, at the seventh step, a search is conducted for a value that can be written as a state |i> in the superposition defined by Eq. (1).

In embodiments, at an eighth step (716), the m+3-qubit Toffoli gate $T_{c\text{-}supD_1D_2\ldots D_md_qsup}^{m+2}$ is applied, this gate has m+2 control qubits which are m qubits of the register |D>, the qubit |dq>, and the qubit |c-sup>, where the target qubit of this gate is |sup>. In embodiments, the eight step marks by entanglement, with the qubit |sup>, the state in the register |D> that has an address defined by the qubits |qy_1>, |qy_2>, . . . , |qy_n> and has the data value defined by the qubits |qy_(n+1)>, |qy_(n+2)>, . . . , |qy_(n+m)>.

In embodiments, at a ninth step (718), the controlled-V gate is applied. In embodiments, the controlled-V gage is a 3-qubit gate is controlled by the control qubit |c-sup>, and is applied on the two qubits are |dq>, and |sup>. In embodiments, the V-gate is defined as:

$$V = \begin{pmatrix} 1 & 0 & 0 & 0 \\ 0 & 1 & 0 & 0 \\ 0 & 0 & a_i & b_i \\ 0 & 0 & -b_i & a_i \end{pmatrix}$$

If it is required to write a basis state |i> with a probability amplitude $$\sqrt{\frac{\alpha_i}{M}}$$

into a weighted superposition then the parameters $$b_i = \frac{\sqrt{\frac{\alpha_i}{M}}}{a_{i-1}},$$

and $a_i = \sqrt{1-a_i^2}$, such that $a_0=0$. If $\alpha_i = M - \Sigma_{j=1,i-1}\alpha_j = 1$ then $a_i=0$, and $b_i=-b_i=1$.

In embodiments, at a tenth step (720) the controlled-controlled-controlled-P gate is applied, this gate is controlled by 3 qubits which are |c-phase>, |sup>, and |dq>. In embodiments, the target qubit is any one of the qubits in the register |D>. In embodiments, the P gate is a phase shift gate that specify the relative phase $\theta_i$ of the basis state |i> that is storing in the current writing operation in the superposition such that the phase shift gate P is $$P = \begin{pmatrix} 1 & 0 \\ 0 & e^{-i\theta_i} \end{pmatrix}.$$

In embodiments, at +an eleventh step (722) the m+3-qubit Toffoli gate $T_{c\text{-}supD_1D_2\ldots D_md_qsup}^{n+2}$ is applied to undo the result of the eighth step. In embodiments, at a twelfth step (724) the controlled-S operator is applied between each qubit of |qy_(n+1)>, |qy_(n+2)>, . . . , |qy_(n+m)> and its correspondence among the qbits |D_1>, |D_2>, . . . , |D_m>, respectively, such that S-operator is controlled by the qubit |c-sup>. Thus, the twelfth step undoes the result of the seventh step.

In embodiments, at a thirteenth step (726), first the CNOT gate is applied on the two qubits |BI>, and |c-sup> which are the control qubit and the target qubit, respectively. Second, the X gate is applied on the qubit |BI>. Third, the CNOT gate is applied on the two qubits |BI>, and |c-sup> which are the control qubit and the target qubit, respectively. Fourth, the gates used at the sixth step are used again to undo the result of the sixth step. Fifth, the CNOT gate is applied on the two qubits |BI>, and |c-sup> which are the control qubit and the target qubit, respectively. Sixth, the X gate is applied on the qubit |BI>. Finally, the CNOT gate is applied once again on the two qubits |BI>, and |c-sup> which are the control qubit and the target qubit, respectively. In embodiments, at a fourteenth step (728), the Toffoli gate and the two X gates that applied on the qubit |BI> which are used at the fifth step are used again to undo the result of the fifth step for the states that can be used to store new basis states in the same superposition. Remark: for optimization circuit purpose, two of X gates can be removed from step 5 and step 14. In embodiments, at fifteenth step (730), the n+2-qubit Toffoli gate that is applied on n+1 control qubits which are n qubits of the register |A>, the qubit |c-sup> where the target is the qubit |dq>. This gate is used to undo the result of the fourth step.

In embodiments, at a sixteenth step (732), two X (quantum-NOT) gates are applied on the qubit |c-sup> and the qubit |r> to deactivate the ordinary writing operation if |c-sup>=|1> and/or |r>=|1>. Accordingly, the sixteenth step actives the ordinary writing which done by m of controlled-controlled-controlled-SWAP gates is performed, in the next step, by operation if |c-sup>=|0> and |r>=|0>.

In embodiments, at a seventeenth step (734), the set of m controlled-controlled-controlled-SWAP gates are applied, each controlled-controlled-controlled-SWAP gate is controlled by 3 qubits which are the qubit |r>, |c-sup>, and the qubit |dq>, each one of these gate swaps the state of the qubit |D_h>, which has index h in the register |D>, with the qubit which has index |qy_(n+h)> where h=1, 2, . . . , m.

In embodiments, at an eighteenth step (736) two X (quantum-NOT) gates are applied on the qubit |c-sup> and the qubit |r> to undo the effect of the sixteenth step. In embodiments, the second-third steps, and the sixteenth to the eighteenth steps are used if it is needed to writes a given state, that is previously prepared, in the form of a single state or a superposition state prepared compactly without needing to store additional basis states in this state in the future, then the values of the qubits are initialized by $|r\rangle=|0\rangle$, and $|c\text{-sup}\rangle=|0\rangle$.

In embodiments, at a nineteenth step (738), a set of m of 3-qubit Toffoli, $T_{rdqD_iqy_{n+1}}^3$, gates are applied. In embodiments, each $T_{rdqD_iqy_{n+1}}^3$ gate is a controlled-controlled-controlled-NOT gate that has three controls of qubits: $|r\rangle$, $|dq\rangle$, and $|D_h\rangle$. In addition, each of the $T_{rdqD_iqy_{n+1}}^3$ gates has a target qubit $|qy_{n+h}\rangle$ where h=1, 2, . . . m. In embodiments, the nineteenth step performs a reading process from a location/superposition of locations $|d^k\rangle$ that has an address/superposition of address $|a^j\rangle$. In embodiments, the address is specified by the first "n" qubits of register $|qy\rangle$, the reading process is performed only if the state of the qubit $|r\rangle = |1\rangle$. In embodiments, once the nineteenth step is conducted, one or more values may be read from one or more addresses from the location are loaded on the last "m" qubits of the register $|qy\rangle$.

In embodiments, at a twentieth step (740), three gates which were applied in the third step are applied once again. In embodiments, the three gates include the first gate which is the X-gate is applied on the qubit c-sup >. In embodiments, the second the gate is $T_{A_1A_2 \ldots A_nc\text{-sup } d_q}^{n+1}$ that is controlled by n+1 qubits which are $|c\text{-sup}\rangle$ and n qubits register of the register $|A\rangle$, and the target qubit is $|dq\rangle$. In embodiments, the third gate is the X-gate is applied on the qubit $|c\text{-sup}\rangle$. In embodiments, the twentieth step undoes the effect of the third step.

In embodiments, at a last step (742) the S-operator is applied between the first n quibts of the register $|qy\rangle$ and the register $|A\rangle$ to undo the effect of the second step.

Figure 8:
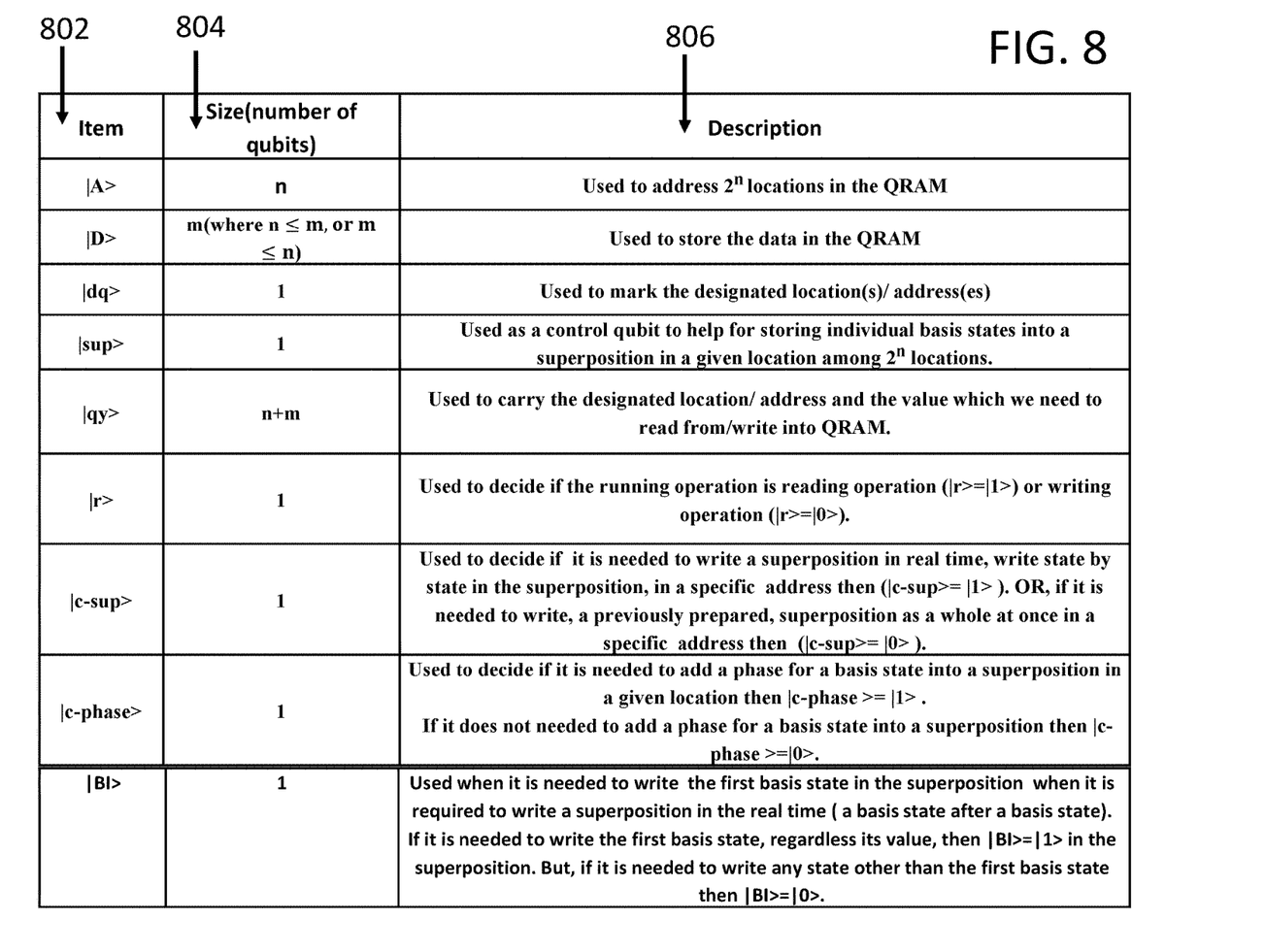
FIG. 8 is a diagram of quantum registers.

FIG. 8 shows an example information table that describes various features of circuit 700. As shown in FIG. 8, item 802 describes different registers that are shown in column 701 of FIG. 7. Item 804 shows the size of qubits associated with each register, and item 806 provides detail about a particular register. In embodiments, Register $|A\rangle$ is an address register which is used to address the $2^n$ locations of register $|D\rangle$. Thus, register $|A\rangle$ represents the addresses (labeling) of the locations of the variables in a quantum RAM (QRAM). In embodiments, $|A\rangle$ with the size of "n" qubits is used to address $2^n$ locations in the register $|D\rangle$. In embodiments, $|D\rangle$ is with m qubits (where n≤m, or m≤n) and is used to store data. In embodiments, $|dq\rangle$ has only one qubit and is used to mark a designated address/superposition of addresses. In embodiments, $|dq\rangle$ may be initialized by state $|0\rangle$. In embodiments, $|qy\rangle$ may have a qubit size of n+m and is used to carry the designated location(s)/address(es) and value needed to read from/write into QRAM. In embodiments, the first n qubits of register $|qy\rangle$ are used to carry the address of variable location(s) provided by a quantum computer (or quantum circuit/device) while the other m qubits are used to carry the value in the variable to transfer it to a specific location in the quantum RAM ("QRAM") or used to read the data from the QRAM. In embodiments, $|r\rangle$ composed by only one qubit and it is used to decide if the running operation ($|r\rangle=|1\rangle$) is a reading operation being conducted in the QRAM or a writing operation ($|r\rangle=|0\rangle$) is being conducted in the QRAM (e.g., across circuit design 700). In embodiments, $|c\text{-sup}\rangle$ (having a size of 1 qubit) is used to decide if it is needed to write a superposition in real time, write a basis state by a basis state in the superposition, in a specific address then ($|c\text{-sup}\rangle=|1\rangle$). In embodiments, $|c\text{-sup}\rangle$ is needed to write, a previously prepared, superposition as a whole at once in a specific address then ($|c\text{-sup}\rangle=|0\rangle$). In embodiments, $|BI\rangle$ (having a size of 1 qubit) it is used to decide if the current writing basis state is the first basis state in the superposition if $|c\text{-sup}\rangle=|1\rangle$. If it is needed to write the first basis state, then $|BI\rangle=|1\rangle$ in the superposition. But, if it is needed to write any state other than the first basis state then $|BI\rangle=|0\rangle$. In embodiments, $|c\text{-phase}\rangle$ (having a size of 1 qubit) is used to decide if it is needed to add a relative phase for a current writing basis state in a superposition, defined by Eq. (1), in a given location, then $|c\text{-phase}\rangle=|1\rangle$. If $|c\text{-phase}\rangle$ is not needed to add a relative phase for a current writing basis state into a superposition then $|c\text{-phase}\rangle=|0\rangle$. In embodiments, $|sup\rangle$ (having a size of 1 qubit) is used during the process of writing a superposition in real time.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing, electronic networking, quantum computing and/or quantum networking environment and may require one or more computing devices, as described in FIG. 5 to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices, quantum computer, cloud quantum circuit/computer, quantum communication devices, quantum teleportation devices, quantum encryption circuit/devices, and/or quantum networks. Also it will be understood that any of the various actions can result in any type of electronic information and/or quantum information to be displayed in real-time and/or simultaneously on multiple user devices. Any electronic graphs and/or quantum information may be generated by a computing device, such as device 500, and displayed via a graphical user device (GUI) or cloud environment.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A quantum method, comprising:
   at a first step, applying, by a quantum circuit, a number of Hadamard gates to a number of qubits;
   at a second step, applying, by the quantum circuit, between a particular number of qubits of a register |qy> and the register |A> so as to search about this address in the quantum circuit, wherein the second step transforms addresses of the register |A> so as to match the input addresses of the particular number of qubits of the register |qy>, into a state $|1\rangle^{\otimes n}$;
   at a third step, applying, by the quantum circuit, three gates;
   at a fourth step, applying, by the quantum circuit, a n+3-qubit Toffli gate, wherein the Toffli gate has n+2 control qubits which are n qubit of the register |A>, the qubit |c-sup>, the qubit |B⟩, and the target qubit is |dq⟩ ;
   at a fifth step, applying, by the quantum circuit, 2(m+1) negation gates, and a Toffli gate;
   at a sixth step, applying, an input value in the qubits |qy_(n+1)>, |qy_(n+2)>, ..., |qy_(n+m)> is written at the location data register |D_1>, |D_2>, ..., |D_m>,
   at a seventh step, applying, by the quantum circuit, a particular set of m controlled-S gates/operator between each qubit of |qy_(n+1)>, |qy_(n+2)>, ..., |qy_(n+m)> and its associated correspondence among the qbits |D_1>, |D_2>, ..., |D_m>, wherein at the seventh step, a search is conducted for a value that can be written as a basis state |i> in the superposition;
   at an eighth step, applying, by the quantum circuit, m+3-qubit Toffli gate;
   at a ninth step, applying, by the quantum circuit, a controlled-V gate;
   at a tenth step, applying, by the quantum circuit, a controlled-controlled-controlled-Phase Shift gate.

2. The quantum method of claim 1, wherein the Controlled-Controlled-Controlled-P gate; the phase shift gate P is controlled by three qubits.

3. The quantum method of claim 2, wherein the four qubits are |c-phase>, |sup>, |BI>, and |dq>.

4. The quantum method of claim 3, further comprising: undoing, by an additional step, by the quantum circuit, the eighth step.

5. The quantum method of claim 4, wherein one of the three gates, applied at the third step, includes an X-gate.

6. The quantum method of claim 1, wherein a particular order of qubits, registers, and gates can be exchanged within the quantum circuit.

7. The quantum method of claim 1, wherein the quantum circuit includes an S operator, wherein the S operator includes CNOT gates and X gates.

8. The quantum method of claim 1, further comprising:
   at an eleventh step, by the quantum circuit, applying the m+3-qubit Toffoli gate to undo the result of the eighth step.

9. The quantum method of claim 8, further comprising:
   at a twelfth step by the quantum circuit, the controlled-S operator is applied between each qubit of |qy_(n+1)>, |qy_(n+2)>, |qy_(n+m)> and its correspondence among the qbits |D_1>, |D_2>, ..., |D_m>.

10. The quantum method of claim 1, further comprising:
    by the quantum circuit, at a thirteenth step comprising of:
        applying the CNOT gate is on the two qubits |BI>, and |c-sup>;
        applying the X gate on the qubit |BI>;
        applying the CNOT gate on the two qubits |BI>, and |c-sup>;
        applying the gates described in the sixth step to undo the result of the sixth step;
        applying the CNOT gate on the two qubits |BI>, and |c-sup>;
        applying the X gate on the qubit |BI>; and
        applying the CNOT gate again on the two qubits |BI>, and |c-sup>.

* * * * *